United States Patent
Brafford et al.

(10) Patent No.: US 6,326,038 B1
(45) Date of Patent: Dec. 4, 2001

(54) CALCIUM FORTIFICATION OF CHEESE

(75) Inventors: Kristeen Brafford, Grayslake; David Webb Mehnert, Antioch, both of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/536,115

(22) Filed: Mar. 27, 2000

(51) Int. Cl.$^7$ ..................................... A23C 20/00
(52) U.S. Cl. .............................. 426/74; 426/582
(58) Field of Search ................. 426/582, 36, 74

(56) References Cited

U.S. PATENT DOCUMENTS

| | | |
|---|---|---|
| 4,784,871 | 11/1988 | Park . |
| 4,851,243 | 7/1989 | Anderson et al. . |
| 4,871,554 | 10/1989 | Kalala et al. . |
| 4,906,482 | 3/1990 | Zemel et al. . |
| 5,126,145 * | 6/1992 | Evenstad ................. 424/465 |
| 5,215,769 | 6/1993 | Fox et al. . |
| 5,449,523 | 9/1995 | Hansen et al. . |
| 5,514,387 | 5/1996 | Zimmerman et al. . |
| 5,597,595 | 1/1997 | DeWille et al. . |
| 5,609,898 | 3/1997 | Kaji et al. . |
| 5,820,903 | 10/1998 | Fleury et al. . |
| 5,834,045 | 11/1998 | Keating . |
| 5,840,354 | 11/1998 | Baumann et al. . |
| 5,855,936 | 1/1999 | Reddy et al. . |
| 5,945,144 | 8/1999 | Hahn et al. . |
| 6,007,852 | 12/1999 | Reinbold et al. . |
| 6,090,417 * | 7/2000 | Mehnert ................. 426/72 |

* cited by examiner

Primary Examiner—Carolyn Paden
(74) Attorney, Agent, or Firm—Fitch, Even, Tabin & Flannery

(57) ABSTRACT

The present invention provides a method of making flavorful, organoleptically pleasing natural cheese containing a significant level of a calcium supplement. More specifically, the calcium supplement is a mixture of calcium sulfate and tricalcium phosphate. By using a mixture of calcium sulfate and tricalcium phosphate the bitterness normally associated with calcium sulfate and the graininess normally associated with tricalcium phosphate are surprisingly essentially eliminated. The use of these particular calcium sources allows for significant levels of calcium to be incorporated without requiring excessive levels of the calcium compounds. The calcium supplements of the present invention can be used in, for example, cottage cheese, process cheese, and natural cheeses such as, for example, Cheddar cheese, Colby cheese, Monterey Jack, Havarti cheese, Muenster cheese, Brick cheese, Gouda cheese, Mozzarella cheese, and mixtures thereof.

28 Claims, No Drawings

CALCIUM FORTIFICATION OF CHEESE

FIELD OF THE INVENTION

The present invention provides a method of making flavorful, organoleptically pleasing cheese and dairy products, including natural cheeses, which contain significant levels of calcium supplements. More specifically, the calcium supplement of the present invention is a mixture of calcium sulfate and tricalcium phosphate. By using a mixture of calcium sulfate and tricalcium phosphate, the bitterness normally associated with calcium sulfate and the graininess normally associated with tricalcium phosphate are surprisingly and essentially eliminated. The use of these particular calcium sources also allows for significant levels of calcium to be incorporated into cheese products without requiring excessive levels of the calcium compounds in the cheese products. The calcium supplements of the present invention can be used in, for example, cottage cheese, process cheese, cream cheese, yogurt, and natural cheeses such as, for example, Cheddar cheese, Colby cheese, Monterey Jack, Havarti cheese, Muenster cheese, Brick cheese, Gouda cheese, Mozzarella cheese, and mixtures thereof.

BACKGROUND OF THE INVENTION

Food products manufactured for public consumption are often modified by adding nutritional or other types of supplements in order to enhance their nutritional properties. Nutritional fortification of cheese products may include supplementation with trace requirements or additives that benefit the overall state of health of the human body. Examples of nutritional fortification include supplementation by vitamins, minerals, and comparable materials. These supplements are either absolutely essential for human metabolism or enhance the provision of substances that may not be available in sufficient amounts in a normal diet.

In recent years, calcium supplementation or fortification of foods, including cheeses, has received significant attention. Although cheese is a good source of calcium, increasing the calcium levels in cheese may provide additional benefits to the consumer. Increased calcium intake is reported to be especially useful in the prevention or moderating the effects of osteoporosis.

Increased dietary intake of calcium has been shown to be effective in minimizing bone loss in the elderly. Moreover, increased consumption of calcium earlier in life may build reserves that enable a greater tolerance of a negative calcium balance in later years. Increased consumption of calcium, regardless of age, is expected to mitigate or delay the effects of osteoporosis. Thus, persons of all ages could benefit from increased calcium consumption. Unfortunately, the elderly—the very group who might receive the most benefit—often have difficulty in increasing their calcium consumption due to decreasing appetites and metabolism. Thus, increasing the amount of calcium in food products, especially to levels which allows significant calcium intake in spite of reduced overall food intake, is especially important for the elderly population.

A large number of calcium compounds or salts have been used to fortify or supplement food products. Calcium salts which have been suggested for use or have been used as food supplements include, for example, calcium pyrophosphate, calcium hexametaphosphate, monobasic calcium phosphate, calcium glycerophosphate, tricalcium phosphate, calcium ascorbate, calcium citrate, calcium carbonate, calcium gluconate, calcium lactate, calcium malate, calcium oxide, calcium hydroxide, calcium sulfate, calcium acetate, calcium ascorbate, calcium tartarate, calcium malate, and calcium chloride.

These calcium supplements have been used in a wide variety of food products. U.S. Pat. No. 4,784,871 (Nov. 15, 1988) provided a calcium fortified yogurt. According to the patent, any calcium compound which is acid soluble could be used. U.S. Pat. No. 5,449,523 (Sep. 12, 1995) and U.S. Pat. No. 5,820,903 (Oct. 13, 1998) also provided calcium-enriched yogurts. U.S. Pat. No. 5,478,587 (Dec. 27, 1995) provided calcium-enriched deserts.

U.S. Pat. No. 5,834,045 (Nov. 10, 1998) provided calcium fortified acid beverages. This patent reported that the use of a calcium source comprising calcium hydroxide and calcium glycerophosphate with any acidulant will result in a beverage product having a marked improvement in storage stability. U.S. Pat. No. 5,855,936 (Jan. 5, 1999) provided a blend of calcium salts balanced with soluble and insoluble salts which are stabilized with a source of glucuronic acid. This composition is capable of fortifying milk beverages and other dairy-based products without coagulation and sedimentation, and with improved palatability. The calcium salts must be stabilized with the glucuronic acid source. Other calcium sources could optionally be included. Other calcium-enriched beverages are disclosed in, for example, U.S. Pat. No. 4,642,238 (Feb. 10, 1987; dietary and nutritionally balanced drinks); U.S. Pat. No. 4,701,329 (Oct. 20, 1987; milk); U.S. Pat. No. 4,740,380 (Apr. 26, 1988; soft drinks); U.S. Pat. No. 4,871,554 (Oct. 3, 1989; fruit drink); U.S. Pat. No. 4,851,243 (Jul. 25, 1989; milk); U.S. Pat. No. 4,840,814 (Jun. 20, 1989; milk); U.S. Pat. No. 4,906,482 (Mar. 6, 1990; soy milk); U.S. Pat. No. 5,397,589 (Mar. 14, 1995; milk); U.S. Pat. No. 5,690,975 (Nov. 25, 1997; fermented milk); U.S. Pat. No. 5,597,596 (Jan. 28, 1997; low pH beverage); U.S. Pat. No. 5,780,081 (Jul. 14, 1998; milk); U.S. Pat. No. 5,928,691 (Jul. 27, 1999; milk); and U.S. Pat. No. 5,897,892 (Apr. 27, 1999; milk base products).

U.S. Pat. No. 4,673,583 (Jun. 16, 1987) provided a calcium-enriched soy bean curd. U.S. Pat. No. 5,514,387 (May 7, 1996) provided calcium enriched crackers and other baked goods; an emulsifier was used to avoid adverse effect on texture and mouthfeel. U.S. Pat. No. 5,840,354 (Nov. 24, 1998) provided calcium-enriched dried fruit products. U.S. Pat. No. 5,945,144 (Aug. 31, 1999) provided a calcium fortified pasta product.

U.S. Pat. No. 6,007,852 (Dec. 28, 1999) relates to a calcium enriched natural cheese. The preferred calcium source is tricalcium phosphate. The patent indicates that other calcium sources (but does not specifically mention any specific sources) can be used so long as the calcium source forms a suspension rather than a solution in water, skim milk, or cheese milk.

Of course, calcium enrichment or fortification can adversely effect the organoleptic properties of the food product to which it is added. Additionally, some calcium compounds have more adverse effects than others. Calcium sulfate has been found to significantly and adversely effect the organoleptic properties of the food product to which it might be added. Calcium sulfate is generally considered too bitter or too strongly flavored to be used at significant levels. See, e.g., U.S. Pat. Nos. 5,820,903 and 5,840,354. Tricalcium phosphate, although widely used, often contributes a "gritty" texture which can, of course, limit the level to which it can be included in food product. See, e.g., U.S. Pat. No. 5,449,523. Both of these calcium compounds would be desirable to use for calcium fortification of cheese products since they both contain high percentage of calcium: calcium sulfate contains about 29 percent calcium and tricalcium phosphate contains about 39 percent calcium. Moreover, these calcium compounds are relatively inexpensive and, from a cost standpoint, would be attractive for calcium enrichment or fortification.

It would be desirable, therefore, to use both of these compounds in cheese products if the adverse organoleptic properties could be eliminated or significantly reduced. The present invention provides calcium-enrichment compositions which surprisingly and unexpectedly overcome the bitterness normally associated with calcium sulfate and the grittiness normally associated with tricalcium phosphate.

SUMMARY OF THE INVENTION

The present invention provides flavorful, organoleptically pleasing cheese products, including natural cheese products, which are enriched in calcium. The calcium-enriched cheese product of the present invention comprises a cheese product and a calcium-enrichment composition, wherein the calcium-enrichment composition is a blend of about 10 to about 90 percent calcium sulfate and about 10 to about 90 percent tricalcium phosphate. More preferably, the calcium-enrichment composition is a blend of about 30 to about 70 percent calcium sulfate and about 30 to about 70 percent tricalcium phosphate. More preferably, the calcium-enrichment composition is a blend of about 40 to about 60 percent calcium sulfate and about 40 to about 60 percent tricalcium phosphate. Even more preferably, the calcium-enrichment composition is a blend of about 50 percent calcium sulfate and about 50 percent tricalcium phosphate. By using calcium sulfate and tricalcium phosphate in combination, the bitterness normally associated with calcium sulfate and the grittiness normally associated with tricalcium phosphate are substantially reduced and, in some cases, even eliminated. Using the calcium fortification system of this invention, calcium-enriched cheese and dairy products can be produced without significantly affected the organoleptic properties of the cheese products.

DETAILED DESCRIPTION OF THE INVENTION

The present invention provides flavorful, organoleptically pleasing cheese products containing a calcium supplement. The calcium supplement is a blend of about 10 to about 90 percent calcium sulfate and about 10 to about 90 percent tricalcium phosphate. More preferably, the calcium supplement is a blend of about 30 to about 70 percent calcium sulfate and about 30 to about 70 percent tricalcium phosphate. More preferably, the calcium-enrichment composition is a blend of about 40 to about 60 percent calcium sulfate and about 40 to about 60 percent tricalcium phosphate. Even more preferably, the calcium supplement is a blend of about 50 percent calcium sulfate and about 50 percent tricalcium phosphate. Preferably, no other calcium supplements are added to the cheese product; in other words, preferably the calcium supplements of this invention consist essentially of calcium sulfate and tricalcium phosphate. Of course, as those skilled in the art will realize, calcium normally present in the cheese product itself will also contribute to the calcium level of the cheese product. As those skilled in the art will also realize, the amount of the calcium supplement added to a dairy or cheese product can vary depending on the actual product in which the calcium is be incorporated and the desired overall level of calcium in the product. Although it is generally preferred that a blend of calcium sulfate and tricalcium phosphate is first prepared and then incorporated into the cheese product, the calcium sulfate and tricalcium phosphate can be added to the cheese product separately and then blended together along with the cheese product. Other nutritional supplements can, of course, be added if desired.

Food grade calcium sulfate and tricalcium phosphate are widely available commercially. Although other forms of calcium sulfate can be used, calcium sulfate dihydrate is usually preferred.

The calcium supplement of the present invention can be incorporated into a wide range of cheese and dairy products. The present calcium supplement can be used in, for example, yogurt, cottage cheese, process cheese, and natural cheeses such as, for example, cottage cheese, process cheese, cream cheese, yogurt, and natural cheeses such as, for example, Cheddar cheese, Colby cheese, Monterey Jack, Havarti cheese, Muenster cheese, Brick cheese, Gouda cheese, Mozzarella cheese, and mixtures thereof.

Cottage cheese containing the present calcium supplement is especially preferred. Preferably, the calcium supplement is added to the cottage cheese dressings which is then combined with cottage cheese curd using conventional techniques. Since the calcium supplement is preferably added to the dressing, which is then blended with the cottage cheese curd, the calcium supplement cannot interfere with the preparation of the cottage cheese curd.

For other cheese products, the calcium supplement can be incorporated into the cheese product using any suitable technique. The calcium supplement of the present invention can be used in process cheese. Generally, it is preferred that the calcium supplement is incorporated into the process cheese along with, and at the same time as, the emulsifying salts in, for example, the blender or lay-down cooker.

The calcium supplement of the present invention also can be used in natural cheeses. One especially preferred method of incorporating the calcium supplement in natural cheese is described in copending U.S. patent application Ser. No. 09/275,471 filed Mar. 24, 1999, and which is hereby incorporated by reference. In this method, the natural cheeses employed may be derived from the treatment of any dairy liquid that provides cheese curds upon renneting. Such liquids include whole milk, reduced fat milk, skim milk, and any such milk further containing added dairy fractions. Such dairy fractions may be chosen, by way of nonlimiting example, from cream fractions, concentrated milk fractions obtained for example by evaporation, diafiltration and/or ultrafiltration of milk, and comparably treated dairy liquids. The dairy liquid employed in the cheese making fermentation may further contain dried solid components of milk fractions, such as non fat dry milk, cream solids, and the like.

The dairy liquid so provided is subjected to a conventional cheese making process. The cheese may be produced by treatment with a rennet, a cheesemaking culture, or a combination thereof. When a cheesemaking culture is employed, the identity of the resulting cheese, and its characteristic flavor, texture and mouthfeel are governed by the particular culture chosen for the fermentation. In this way, a broad range of natural cheeses may be produced for use in the present invention. These cheeses include, by way of nonlimiting example, Cheddar cheese, Colby cheese, Monterey Jack, Havarti cheese, Muenster cheese, Brick cheese, Gouda cheese, Mozzarella cheese, and the like. Mixtures of such cheeses may also be used.

The desired natural cheese is fragmented or shredded to pieces whose sizes are appropriate for receiving the calcium supplement. The pieces should also be appropriate in size for subsequent compaction to form a cake of calcium-fortified cheese that may be packaged for sale. In general, cheese fragments used may be regular or irregular sized particles. For shredded pieces, the particles are preferably about 1/32 to about 5/8 inches in diameter and about 1 to about 5 inches in length; more preferably, they are about 1/16 inch in diameter and about 2 to 3 inches in length. For more circular pieces, the particles are preferably about 1/2 to about 1 inch in diameter; more preferably, they are about 3/4 inch in diameter. Of course, other shaped particles having similar dimensions to those just discussed can be used. Such cheese particles or fragments generally weigh from about 1/50th of an ounce to about 1–2 ounces. The size of the fragments is appropriate to receive the calcium supplement if, after adding the calcium supplement, the mixture may be blended to distribute the calcium supplement essentially uniformly throughout the blended mixture. If desired, other nutritional supplements can be added separately or at the same time as the calcium supplement.

A composition comprising the calcium supplement is added to the shredded or fragmented cheese. The composition may be a solid blend of the calcium sulfate and tricalcium phosphate, or it may be a suspension or solution of the compounds in a liquid. The liquid may be an aqueous composition or an organic liquid such as a fat or oil, or a volatile edible solvent such as ethanol. As noted above, the cheeses of this invention may contain, in addition to the calcium supplement, other nutritional supplements such as, for example, vitamins, minerals, antioxidants, probiotics, botanicals, and mixtures thereof.

The amount of the calcium supplement added can, of course, vary considerably depending on the targeted consumer and their recommended daily requirement. Generally, the amount of calcium supplement added is in an amount sufficient to provide at least an additional 10 of the United States Recommend Daily Intake (USRDI) per single serving size. Thus, the amount of added calcium supplement will depend on, for example, the targeted consumer, the particular dairy or cheese product, and the single serving size. For example, Cheddar cheese normally contains about 200 mg calcium per 30 gram serving size, which corresponds to about 20 percent of the USRDI for an adult; thus, to obtain an additional 10 percent USRDI, sufficient calcium supplement would be added to provide an additional 100 mg calcium per serving size. Of course, higher levels of calcium could be added if desired. Since both calcium sulfate and tricalcium phosphate contain relatively high levels of calcium, these desired calcium levels can be obtained using relatively low levels of the calcium compounds. Preferably, the calcium supplement is added at a level such that a single serving size of the calcium-fortified cheese product will provide at least about 10 percent additional calcium (i.e., in addition to the calcium normally present in the product) of the recommended daily calcium requirement (currently about 1000 mg calcium for an adult) per serving size. As those skilled in the art will realize, lower or higher amounts can also be used taking into account the nutritional requirements of consumers.

In operation, the calcium supplement can be added to the cheese shreds or fragments in, for example, a tumble drum mixer. Calcium sulfate and tricalcium phosphate may be added separately or, more preferably, as a blend. If added as a liquid dispersion or suspension, the calcium supplement may be added, for example, using a sprayer or an atomizer, or it may be added dropwise from a nozzle. Solid calcium supplements may be added as a particulate mixture or blend of the components using conventional devices. For solid calcium supplements, the particle size is generally in the range of about 5 to about 50 microns. Of course, other methods of introducing the calcium supplements can be used so long as they can be effectively distributed over the surfaces of the cheese shreds or particles. The drum revolves slowly such that the cheese fragments and the calcium (and any other nutritional supplements that may be added) are blended together in a uniform fashion. Of course, other types of mixer can be used if desired; such mixers include, for example, single screw augers, V-blenders, and the like.

Once blended, the cheese fragments fortified with the calcium supplement are compacted to form solid pieces of calcium supplemented or enriched cheese. Suitable equipment for compaction includes, for example, presses, extruders, compactors, pumps, and the like. Examples of apparatus useful for compacting cheese fragments are disclosed, for example, in U.S. Pat. No. 3,562,910 and in U.S. Pat. No. 4,039,695, which are incorporated herein by reference. The compacted cheese and calcium-supplement blend is preferably extruded from the compacting apparatus in the form of a continuous strip whose cross section is determined by a die at the effluent point of the apparatus. The strip can then be cut into individual pieces, shapes, blocks, or the like for packaging, shipment, and sale. Preferably the extrusion step is carried out without significant shear on the extruded cheese product. In some cases, it may be desirably and preferably to extrude at an elevated temperature (i.e., an extrusion head temperature of about 65 to 95° F.); the cheese temperature is preferably maintained at about 35 to about 65° F. Using an extrusion die coated with Teflon™ or other low friction material is generally preferred.

As discussed above, it is generally preferred that the calcium supplements are only added after the natural cheese has been manufactured. Thus, the calcium supplements cannot interfere with the fermentation and/or flavor development steps. The calcium supplements are preferably added after the natural cheese has been shredded or otherwise reduce to relatively small particles. The calcium supplements and natural cheese particles are then blending so as to obtain an essentially homogeneous mixture of cheese particles coated with the calcium supplements. The coated cheese particles are then extruded into the desired shapes, thereby further mixing or blending the calcium supplements throughout the cheese blocks or strips. The resulting cheese can then be cut to the desired size and/or shape for the retail or other market.

The following examples are intended to illustrate the invention and not to limit it. Unless otherwise noted, all percentages are by weight.

EXAMPLE 1

Cottage cheese is a blend of dressing and curd. Both the cottage cheese curd and dressing were prepared using conventional methods. For the dressing, the liquid diary ingredients (i.e., skim milk and cream) are blended together in a well-agitated tank. The dry ingredients (i.e., salt, starch, gum, and the calcium source were then added. The calcium source was a 50/50 blend of calcium dihydrate and tricalcium phosphate. The mixture was then standardized to the desired milkfat and total solids. The standardized mixture was then heated to about 130 to about 150° F. and homogenize (single stage) at about 900 to about 1100 psi. After pasteurization at about 180 to about 190° F. for about 25 to about 45 seconds, the mixture was cooled to about 155 to about 160° F.

The cottage cheese curd was prepared using pasteurized skim milk. After adjusting the temperature to about 90 to about 93° F., a conventional starter culture is added to the mixture which is allowed to coagulate in a water-jacketed vat. The inoculated mixture was held at about 90 to about 93° F. for about 3 to about 6 hours. The pH of the coagulum is periodically checked until the target pH of about 4.7 is achieved. Once a pH of about 4.7 is obtained, the coagulum is cut. The curd is allowed to sit undisturbed for about 30 to about 45 minutes to heal. After healing, the vat is stirred gently and the temperature of the water-jacketed vat is increased to about 120 to about 140° F. Once the temperature of the whey reaches about 105 to about 115° F., vigorous stirring may be used. The cooking process takes about 60 to about 105 minutes after healing. After allowing the whey to drain out, the curd is washed twice with water (generally about 120 to about 125° F. After washing, the curd is allowed to drain.

The drained curd and dressing are then combined using conventional techniques to produce cottage cheese. Various forms of calcium were added to the dressing prior to being blended with the cottage cheese curds. The resulting cottage cheeses were then evaluated by a trained test panel using a scale of 1 (less preferred) to 6 (most preferred). The amount of calcium added was equivalent to about 40 percent of the daily minimum requirement of calcium per serving (single servicing size is about 110 gr). The following results were obtained:

| Form of Calcium | Taste | Texture | Mouthfeel |
|---|---|---|---|
| Control (no added calcium) | 6 | 6 | 6 |
| $Ca_3PO_4$ | 6 | 2 | 2 |
| $CaSO_4 \cdot H_2O$ | 2 | 6 | 6 |
| 50% $Ca_3PO_4$ & 50% $CaSO_4 \cdot H_2O$ | 5 | 5 | 5 |

Tricalcium phosphate added alone, although not impacting taste, significantly impaired both texture and mouthfeel. Calcium sulfate added alone, although not impacting texture or mouthfeel, significantly impaired taste. Neither of these products (i.e., calcium sulfate alone or tricalcium phosphate alone) would be acceptable for a commercial product. The cottage cheese product fortified with both calcium sulfate and tricalcium phosphate provided excellent flavor, texture, and mouthfeel and was comparable to the control cottage cheese. The cottage cheese product using the calcium supplement of this invention provided significant level of calcium without adversely affecting the organoleptic properties.

EXAMPLE 2

Shredded natural cheese is prepared in an Urschel dicer with knives/controls set for the production of particulated cheese with dimensions of about 1/16 by 1/16 inches and about 2 to 3 inches long. The particulate process takes place at temperatures between about 35 to 45° F. Dry calcium supplement (about 50 percent calcium sulfate and about 50 percent tricalcium sulfate) and liquid natamycin (a natural mold inhibitor) are added to the particulated cheese pieces in a 6 foot stainless steel tumble drum. The calcium supplement is added at a rate of about 3 to about 5 percent and natamycin at about a 1.2 percent based on the total weight of the final product. The final target for total calcium (i.e., the sum of calcium in the standard cheese plus calcium from the calcium supplement) about 500 mg per 30 grams of cheese (i.e., about 50 percent of the recommended daily calcium intake in a single serving). If desired, the natural cheese can be fortified with additional nutrients (i.e. Vitamins A, D, C, E) at the same time the calcium supplement is added. The cheese shreds, calcium supplement, natamycin, and other additives) are blending together in the tumble drum for about 30 seconds to obtain a homogeneously mixed cheese blend.

The result homogeneously mixed cheese blend is continuously loaded into a VF50 vacuum filler manufactured by Handtmann Inc. and then extruded at about 65 to about 75° F. and cut to obtained the desired chunk/weight of cheese. The chunks are then passed through metal detection, sprayed with natamycin, and gas flushed with carbon dioxide and/or nitrogen prior to sealing and case packing.

We claim:

1. A calcium-enriched cheese product comprising a cheese blended with a calcium supplement, wherein the calcium supplement is a blend of about 10 to about 90 percent calcium sulfate and about 10 to about 90 percent tricalcium phosphate and wherein the calcium-enriched cheese product has organoleptic properties comparable to a similar, but not calcium-enriched, cheese product.

2. The calcium-enriched cheese product of claim 1, wherein the calcium supplement is a blend of about 30 to about 70 percent calcium sulfate and about 30 to about 70 percent tricalcium phosphate.

3. The calcium-enriched cheese product of claim 2, wherein a single serving of the calcium-enriched cheese product provides at least an additional 10 percent of the daily minimum requirement of calcium.

4. The calcium-enriched cheese product of claim 1, wherein the cheese is cottage cheese comprising a cottage cheese curd and a cottage cheese dressing.

5. The calcium-enriched cheese product of claim 4, wherein the calcium supplement is incorporated into the cottage cheese dressing prior to forming the cottage cheese.

6. The calcium-enriched cheese product of claim 5, wherein a single serving of the calcium-enriched cheese product provides at least an additional 10 percent of the daily minimum requirement of calcium.

7. The calcium-enriched cheese product of claim 4, wherein a single serving of the calcium-enriched cheese product provides at least an additional 10 percent of the daily minimum requirement of calcium.

8. The calcium-enriched cheese product of claim 1, wherein the cheese is a process cheese.

9. The calcium-enriched cheese product of claim 8, wherein a single serving of the calcium-enriched cheese product provides at least an additional 10 percent of the daily minimum requirement of calcium.

10. The calcium-enriched cheese product of claim 1, wherein the cheese is a natural cheese.

11. The calcium-enriched cheese product of claim 10, wherein the calcium-enriched cheese product is prepared by a method comprising:

(1) shredding the natural cheese to form pieces whose general size is effective to receive the calcium supplement;

(2) adding the calcium supplement to the shredded cheese to form a mixture;

(3) blending the mixture to achieve an essentially homogeneous mixture; and (4) compressing the essentially homogeneous blended mixture to form the calcium-enriched cheese product.

12. The calcium-enriched cheese product of claim 11, wherein the natural cheese is chosen from the group consisting of Cheddar cheese, Colby cheese, Monterey Jack, Havarti cheese, Muenster cheese, Brick cheese, Gouda cheese, Mozzarella cheese, and mixtures thereof.

13. The calcium-enriched cheese product of claim 12, wherein a single serving of the calcium-enriched cheese product provides at least an additional 10 percent of the daily minimum requirement of calcium.

14. The calcium-enriched cheese product of claim 11, wherein a single serving of the calcium-enriched cheese product provides at least an additional 10 percent of the daily minimum requirement of calcium.

15. The calcium-enriched cheese product of claim 10, wherein a single serving of the calcium-enriched cheese product provides at least an additional 10 percent of the daily minimum requirement of calcium.

16. The calcium-enriched cheese product of claim 1, wherein a single serving of the calcium-enriched cheese product provides at least an additional 10 percent of the daily minimum requirement of calcium.

17. A calcium-enriched dairy product comprising a dairy product blended with a calcium supplement, wherein the calcium supplement is a blend of about 10 to about 90 percent calcium sulfate and about 10 to about 90 percent tricalcium phosphate and wherein the calcium-enriched dairy product has organoleptic properties comparable to a similar, but not calcium-enriched, dairy product.

18. The calcium-enriched dairy product of claim 17, wherein the calcium supplement is a blend of about 30 to about 70 percent calcium sulfate and about 30 to about 70 percent tricalcium phosphate.

19. The calcium-enriched dairy product of claim 18, wherein the dairy product is yogurt.

20. The calcium-enriched dairy product of claim 19, wherein a single serving of the calcium-enriched dairy product provides at least an additional 10 percent of the daily minimum requirement of calcium.

21. The calcium-enriched dairy product of claim 18, wherein a single serving of the calcium-enriched dairy product provides at least an additional 10 percent of the daily minimum requirement of calcium.

22. The calcium-enriched dairy product of claim 17, wherein the dairy product is yogurt.

23. The calcium-enriched dairy product of claim 22, wherein a single serving of the calcium-enriched dairy product provides at least an additional 10 percent of the daily minimum requirement of calcium.

24. The calcium-enriched dairy product of claim 17, wherein a single serving of the calcium-enriched dairy product provides at least an additional 10 percent of the daily minimum requirement of calcium.

25. A calcium supplement for incorporation in food products, said calcium supplement comprising a dry blend of about 10 to about 90 percent calcium sulfate and about 10 to about 90 percent tricalcium phosphate.

26. The calcium supplement as described in claim 25, wherein the dry blend contains about 30 to about 70 percent calcium sulfate and about 30 to about 70 percent tricalcium phosphate.

27. The calcium supplement as described in claim 26, wherein the dry blend contains about 40 to about 60 percent calcium sulfate and about 40 to about 60 percent tricalcium phosphate.

28. The calcium supplement as described in claim 27, wherein the dry blend contains about 50 percent calcium sulfate and about 50 percent tricalcium phosphate.

* * * * *